Patented Aug. 23, 1949

2,479,637

UNITED STATES PATENT OFFICE 2,479,637

TITANIUM OXIDE PIGMENT PRODUCTION

Carl Marcus Olson, Hayden Park, Del., assignor to E. I. du Pont de Nemours & Company, Wilmington, Del., a corporation of Delaware No Drawing. Application January 9, 1942, Serial No. 426,247

6 Claims. (Cl. 23—202)

This invention relates to titanium oxide pigment production and more particularly to the manufacture of improved titanium oxide pigments in substantially rutile, crystalline form. More specifically, it relates to a novel, highly useful nucleating or accelerating agent especially useful in titanium sulfate solution hydrolysis, whereby the hydrolysate obtained therefrom readily converts to rutile of excellent color and tinting strength characteristics, when calcined at a relatively low temperature.

Many processes for obtaining titanium oxide through hydrolysis of titanium salt solutions are known, some of which have been widely exploited commercially. Those which employ titanium sulfate solutions, rather than chloride solutions, are favored most in industrial applications, principally because sulfate solutions are more easily prepared (the common titanium-bearing mineral, ilmenite, being easily dissolved in sulfuric acid) and are less corrosive towards plant equipment than are chloride solutions.

Titanium sulfate solutions, on hydrolysis, yield precipitated raw anatase pigment, while chloride solutions (provided certain carefully chosen conditions are observed) hydrolyze to rutile. Of the three $TiO_2$ crystalline modifications, i. e., anatase, brookite and rutile, the latter exhibits the highest refractive index and therefore possesses the highest potential hiding power. This relatively high hiding power, however, only exists when the titanium oxide particles are of relatively minute, uniform size, and smaller, preferably, than those of pigment anatase exhibiting certain optimum hiding power and other pigmentary properties.

The precipitated raw pigment obtained from titanium sulfate solution may be converted to rutile by calcination treatment at relatively high temperatures, well in excess of substantially 1000° C. However, the use of these excessively high temperatures exerts an adverse effect upon the properties of the final product, especially its tinting strength, color and hiding power. As a consequence, the resulting product often becomes wholly unfit for use as a pigment for many ordinary or intended applications.

In the co-pending applications of John L. Keats et al., Serial No. 283,052, filed July 6, 1939, and Ser. No. 283,051, filed July 6, 1939 both now abandoned, useful methods are disclosed for preparing rutile titanium oxide pigments of good color and hiding power through hydrolysis of titanium sulfate solutions in the presence of certain novel seeding agents, comprising peptized $TiO_2$ sols. In the preparation of these sols, precipitated orthotitanic or metatitanic acid is conditioned by suitable heat treatment in the presence of a monobasic acid, preferably hydrochloric or nitric acids. Substantial amounts of univalent anions, especially nitrate or chloride ions, being present in these sols, corrosion of the hydrolysis tanks and other equipment used in the titanium producing operation takes place and at a rather marked, accelerated rate. Additionally, the hydrolysate tends to settle from its mother liquor very slowly and its recovery through separation is had only after prolonged, undisturbed standing of the precipitate in its residual hydrolysis mother liquor. Since all residual liquor must be removed by filtration from the precipitate, the slow filtering characteristics of the latter render liquor removal a rather difficult, time-consuming and expensive operation. Furthermore, the sols which are employed in such processes are relatively dilute in nature and the residual liquor recovered after hydrolysis is so dilute that an expensive evaporation step must be resorted to in order to sufficiently concentrate the liquor to enable its reuse in the titanium ore-solubilizing operation or other step of the system. It has been found that the foregoing and other disadvantages in prior procedures for obtaining rutile titanium oxide pigments, and especially those which contemplate converting anatase to rutile by high temperature calcination treatment, can be effectively remedied. Further, it has been discovered that an improved type of rutile titanium oxide pigment having excellent color, hiding power, tinting strength and other essential pigment properties can be readily obtained from titanium sulfate solutions containing substantial amounts of color-imparting impurities.

Accordingly, it is among the objects of my invention to provide a novel method of hydrolyzing a titanium salt solution, and especially titanium sulfate, whereby an improved rutile titanium oxide pigment may be readily obtained therefrom upon calcining the resulting hydrolysate at calcination temperatures of a relatively low order. It is among the particular objects of my invention to provide a process which, while retaining the advantages inherent in the aforementioned sol-addition process, eliminates the operating and other difficulties encountered therein, particularly excessive corrosion of equipment, poor settling and filtering characteristics of the hydrolysate recovered therefrom, and procurance of objectionably dilute residual hydrolysis liquors. Further objects include the production of an improved rutile titanium oxide pigment which, in addition to the desired pigment characteristics already alluded to, is inherently uniform and small in particle size; to provide a process in which such a type of pigment can be obtained through conversion of precipitated anatase by calcination at temperatures below substantially 1000° C.; and to effect such production from a hydrolyzable titanium sulfate solution containing substantial amounts of color-imparting and other impurities, through use of a novel and efficient type of nucleating agent; to effect production of an improved titanium oxide pigment through hydrolysis of a titanium sulfate solution and through use of a type of nucleating or accelerating agent which directly influences the hydrolysis precipitate to such an extent that said precipitate characteristically settles very rapidly and provides a relatively thickened precipitate slurry adapted for ready and quick filtering. Additional objects of the invention will be apparent from the ensuing description thereof.

These and other objects are attainable in this invention which comprises hydrolyzing a titanium sulfate solution in the presence of a coagulated seed material.

In a more specific and preferred embodiment, the invention comprises obtaining a rutile titanium oxide pigment by hydrolyzing a titanium sulfate solution in the presence of a small amount of a coagulated $TiO_2$ seed or accelerating agent obtained by subjecting a ripened, peptized sol of colloidal titanium oxide to treatment with a soluble sulfate in an amount sufficient to relatively completely coagulate said sol, and then calcining the recovered anatase $TiO_2$ precipitate from such hydrolysis at a temperature not in excess of substantially 1000° C. to obtain a high quality rutile pigment having excellent color, tinting strength and other essential pigment properties.

One practical and preferred embodiment of the invention will be now illustratively described, in which hydrolysis of a titanium salt solution, and especially titanium sulfate, is effected in the presence of my novel nucleating agent, comprising a separately-prepared, coagulated, acidified suspension of titanium oxide. The titanium oxide sol intermediate may be conveniently prepared from relatively pure orthotitanic acid by first precipitating and then suitably peptizing the orthotitanic acid in accordance with the procedures described in the aforesaid Keats, et al. application. The orthotitanic acid so employed preferably comprises an amorphous type, as distinguished from a more crystalline form thereof, and is readily soluble in relatively dilute (10–25%) mineral, especially sulfuric, or organic acids. The orthotitanic acid may be conveniently obtained by neutralizing, at room temperatures, a solution of a relatively pure titanium compound, such as a sulfate, nitrate, chloride, fluoride, iodide, oxalate or other soluble titanium compound, or halogen, especially titanium sulfate or fluoride, with an alkaline solution such as ammonium, sodium or potassium hydroxides or carbonates, other soluble neutralizing agents, or those which become soluble during the reaction, as magnesium oxide. Complete removal of all sulfate ions or other soluble polyvalent anions present in the resulting precipitate is then effected, either by washing and filtering or neutralizing said precipitate with sodium carbonate or other alkaline agent. The purified product is then slurried in aqueous media, particularly water, to obtain a slurry suspension containing about 35 g. $TiO_2$ per liter or one having a concentration ranging from about 5–70 g. $TiO_2$ per liter. Peptization of the $TiO_2$ is then effected by mixing a monobasic acid peptizing agent (preferably hydrochloric or nitric acid) with said slurry. The amount and strength of conditioning acid so employed is insufficient, preferably, to effect dissolution of the orthotitanic acid, but is sufficient to provide a concentration of about 0.3 N, a preferred concentration being from about .2 to about .8 N. The resulting orthotitanic acid-monobasic acid mixture is then conditioned or cured by heat treatment in order to suitably ripen or age the sol. Conveniently, this may be accomplished by maintaining the mixture at a temperature of about 80° C. for a short period of time (or within a range of from about 50° C. to 100° C.) for a relatively short period of about 15–20 minutes. Generally, however, such period may range from about 5 minutes to several hours, depending on the temperature selected and the concentrations employed. The conditioned sol which results is then suitably coagulated, forming a seeding agent which is relatively insoluble in titanium sulfate solutions even under the conditions prevailing during hydrolysis and is capable of acting as a hydrolysis nucleating agent, the presence of a small amount of which in the hydrolysis provides my novel form of hydrolysate. If desired, coagulation may be deferred until such time as use of the coagulated nucleating agent is required, in which event the sol may be cooled to a temperature below about 60° C. (preferably under 50° C.) and stored in cooled condition until coagulation and use is desired.

Coagulation of the peptized $TiO_2$ sol may be effected in any desired manner, but preferably is accomplished by incorporating in said sol a suitable coagulating agent, particularly a negative, divalent coagulating ion, substantially free from color-impairing impurities, especially chromium, vanadium, iron and the like. Aqueous solutions in which polyvalent anions, especially sulfate ions, are present, and particularly sulfuric acid, are especially useful in the invention and hence are preferred. For instance, an aqueous solution of a sulfate ion-containing compound, such as sodium sulfate or sulfuric acid, may be added to or otherwise admixed with the sol, such addition being continued until substantially complete coagulation of the seeding agent takes place. Substantially complete separation of the coagulated seed material from the monobasic acid sol-forming agent is then effected, either by centrifuging the coagulated suspension (followed by washing of the recovered seed with water) or by filtering, decanting and washing, if desired.

The seeding agent suspension thus prepared may be employed directly in effecting hydrolysis of a titanium sulfate solution by conveniently adding said seed thereto or otherwise admixing the same therewith while maintaining said solution at either room or elevated temperatures. Thereafter, the seeded soluton is then hydrolyzed by raising the temperature of the mixture to the boiling point and maintaining it at such temperature for a period of about 15–30 minutes or several hours, or until substantially complete hydrolysis becomes effected. Only a relatively small quantity of the coagulated seed material need be employed in the hydrolysis, such amount usually ranging from a fraction of about 1% to about 10–15%, a preferred quantity being from about 1-5%, based on the $TiO_2$ in the solution to be hydrolyzed.

After filtering and washing the anatase precipitate which is recovered from said hydrolysis, the purified product is subjected to calcination at a temperature not in excess of substantially 1000° C. nor below substantially 750° C., a preferred temperature being from about 850° C. to 975° C. The resulting pigment will comprise a rutile converted titanium oxide product which is relatively uniform and desirably small in average particle size. That is, it will have an average particle size not exceeding substantially 0.25 micron in radius and will usually range within from about 0.14 to below 0.25 micron. Possessing excellent color, tinting strength and hiding power characteristics, said pigment will be admirably suited for use in all manners of pigment application, especially in coating compositions, such as paints, enamels and lacquers, wherein these pigment properties are essential.

To a more complete understanding of the invention the following specific examples are given, which are to be considered as merely in illustration and not in limitation of my invention:

*Example I*

Orthotitanic acid was precipitated through the mixing of a titanium sulfate solution and ammonium hydroxide solution. The titanium sulfate solution was relatively free of iron, and contained about 100 grams $TiO_2$/liter. The precipitation was carried out at room temperature by simultaneously adding the two solutions to a reaction tank while maintaining the pH within the tank at about 7. Conducting the reaction at room temperature avoided changing the orthotitanic acid to metatitanic acid. The precipitate was then filtered and washed to render it sulfate-free. It was then slurried in water to provide a suspension containing approximately 40 grams $TiO_2$/liter. 19 cc. of 70% $HNO_3$ were then added per liter of slurry and the mixture agitated and heated to 85° C., and this temperature was maintained for 30 minutes. At the end of that time cooling was effected by quenching with an equal amount of water, after which the suspension was coagulated by the addition of sodium carbonate in amount sufficient to equal the original acidity of the dispersion. Upon neutralization, flocculation of the dispersed titanium compound occurred and the flocculated material was then washed substantially free of nitrate ions. The resulting coagulated seed material was re-suspended in water at a concentration of about 70 grams $TiO_2$/liter in which condition it was used as a nucleating agent in the hydrolysis of an ilmenite sulfate solution. The latter was available in a concentration equivalent to 190 grams $TiO_2$/l. with a factor of acidity of about 70. 10 grams of $TiO_2$ in the form of the seed suspension was intermixed with each liter of the titanium sulfate solution and the mixture was heated to boiling. After three hours boiling time the yield was found to be 96%. The product was easily filtered and washed to remove impurities present during the hydrolysis, and upon calcination at a temperature of 950° C. was found to convert quite readily to rutile. The resulting calcined rutile pigment was found to be high in hiding power and of good color.

*Example II*

Commercial titanium tetrachloride was dissolved in hydrochloric acid and subsequently diluted to 10 grams $TiO_2$/l. This solution was then heated to 85° C. for 15 minutes, after which it was coagulated by the addition of sulfuric acid. The amount of sulfuric acid used may be varied within wide limits but an amount equal in weight to the $TiO_2$ content of the dispersion was selected in this instance. The flocculated or coagulated suspension was dewatered and washed to remove chloride ions. The resulting suspension was then adjusted to a concentration of 60 grams $TiO_2$/liter and stored for use as a nucleating agent in the hydrolysis of titanium sulfate solutions. A titanium sulfate solution containing 200 grams $TiO_2$/liter and prepared from ilmenite through the use of sulfuric acid was hydrolyzed through the addition of one volume of seed suspension to each ten volumes of the sulfate solution. The seed was incorporated at ordinary room temperature with the aid of vigorous agitation, after which the seeded solution was placed in a tank adapted to heating to the boiling point and in which mild agitation was provided. After 4 hours boiling the yield was found to be 95.5%. The suspension was cooled and filtered to remove impurities present in the original ilmenite solution. This was not found difficult due to the ease with which filter cakes are built from the hydrolyzate product. Upon calcination at a temperature of 940° C. the product was found to possess the rutile crystal structure and the conversion of the precipitate to the rutile form was found to occur at relatively low temperatures, that is, between 50 and 100° lower than ordinary sulfate hydrolysis materials. The color and hiding power of the resulting pigment was found to compare favorably with rutile pigments prepared from purified titanium tetrachloride solutions hydrolyzed under the most favorable conditions. The hiding power and tinting strength were found to be about 33% greater than that normally found for commercial anatase pigments.

*Example III*

To a 25° C. titanium sulfate solution, comprising $Ti^{++++}$ in an amount equivalent to 145 grams $TiO_2$ per liter, $Ti^{+++}$ in an amount equivalent to 1.2 grams $TiO_2$ per liter, 63 grams $Fe^{++}$ per liter, 264 grams per liter $H_2SO_4$ (free and combined with titanium), and having an F. A. of 48, was added, accompanied by vigorous agitation, ammonium hydroxide in an amount sufficient to raise the pH of the solution to 4. The suspension was stirred for 15 minutes, the orthotitanic acid precipitate being then filtered and washed sulfate-free. The purified precipitate was then slurried in water to provide a suspension comprising orthotitanic acid in an amount equivalent to 20 grams $TiO_2$ per liter. Hydrochloric acid in an amount sufficient to provide a 0.3 N acid solution was then added, and the mixture was heated to a temperature of 85° C., being maintained at said temperature for a period of 25 minutes. The resulting titanium oxide sol was cooled to 25° C. and coagulated by addition of sulfuric acid in the amount of 5 grams $H_2SO_4$ per liter of sol. The coagulated sol was allowed to settle, the supernatant liquor was decanted off and the coagulated seed suspension was filtered, and washed until substantially free from chloride ions. Said suspension was then reslurried in water to provide a coagulated seed material having a concentration equivalent to 25 grams $TiO_2$ per liter. This latter suspension was then heated to a temperature of 68° C. and then added to a titanium sulfate solution identical in composition to that from which the orthotitanic acid precipitate was obtained. The seed material was added to said titanium sulfate solution in an amount equivalent to 5 grams $TiO_2$ per 100 grams of dissolved $TiO_2$ in said solution. The seeded mixture was then heated to boiling and maintained at such temperature for a period of 20 minutes, as a result of which 97% of the titanium in the mixture was converted to hydrolysis precipitate. This precipitate likewise settled rapidly on filtration, and on subsequent calcination provided a rutile pigment titanium dioxide equal in all respects to that obtained in preceding Example I.

The color, tinting strength, and other pigment properties and values herein referred to were determined by the methods referred to in U. S. patent to J. E. Booge No. 2,253,551.

While specific types and amounts of coagulants for treating peptized $TiO_2$ sols have been mentioned herein, the invention is not to be construed as limited thereto. Generally, I contemplate using all useful types of coagulating or neutralizing agents which react with acids present in the sol to induce the desired coagulations. These include such soluble bases as the alkali metal hydroxides or carbonates (particularly those of sodium, potassium, lithium, etc.) or those of ammonia; also, alkaline earth metal hydroxides, such as those of calcium, barium, etc., or mixtures of such bases. Polyvalent anion-containing compound coagulants, especially the di or trivalent variety, such as sulfates or phosphates, are also contemplated for use. Other coagulants include: sulfuric acid, metallic sulfates, such as those of aluminum, sodium or titanium sulfate or such acids as oxalic acid, tartaric acid or alkali solutions of such acids, especially sodium sulfate or sodium oxalate, tartrate, etc. Similarly, other acid salts, comprising compounds of a base and acid radical containing unreplaced hydrogen atoms from the acid, or mono-basic acids mixed with divalent anion compounds, such as hydrochloric acid and sodium or potassium sulfate, or sulfamic acid and potassium or sodium sulfate, can be employed. The coagulating agent so used is preferably substantially free from color-imparting impurities, especially those of chromium or vanadium, etc., and preferably, also, the coagulation of the sol is effected by incorporating the agent into the sol by directly adding thereto a sufficient quantity, in aqueous solution, of an alkaline reacting material, especially alkali metal hydroxides, or polyvalent anion compounds. Where the sol has been prepared through use of an oxidizing acid, such as nitric acid, the coagulant used may, if desired, be in the form of a reducing agent, such as formic acid, formaldehyde, titanous sulfate, or the like. I also contemplate effecting coagulation through use of dehydrating organic agents, such as alcohols, or through use of coprecipitation agents which include other colloids, for example, glue. Also coagulation may be effected by ultrasonic vibrations or other physical means.

While my novel seeding agent may be used in titanium sulfate solutions the concentration of which may vary widely and contain titanium compounds in an amount equivalent to form about 50 grams or less $TiO_2$ per liter to about 275 g. $TiO_2$ per liter, sulfuric acid, free and combined, in an amount not in excess of about 600 g. per liter, and have an F. A. value ranging from about 0 to about 100, to obtain my preferred type of anatase precipitate adapted to convert on calcination to a rutile pigment exhibiting the optimum pigment characteristics referred to, I employ during the hydrolysis titanium sulfate solutions which contain an amount equivalent to from about 100 to about 225 g. $TiO_2$ per liter, and preferably amounts equivalent to from about 150 to about 200 g. $TiO_2$ per liter, with the mixture having an F. A. value in the range of from about 40 to about 80.

Although I prefer to employ a coagulated seeding agent derived from a previously peptized, collodial $TiO_2$ sol intermediate derived from precipitated orthotitanic acid, other forms of positively-charged titanium oxide sols and from other sources may be used in the invention. For instance, a solution of a salt of titanium and monobasic acid such as titanium chloride, nitrate, etc., may be suitably heat treated to obtain a sol. A preferred method comprises heating the titanium salt solution (containing titanium in an amount equivalent, preferably, to from about 10 to about 20 g. $TiO_2/l$.) at a temperature between 70° C. and the boiling point of the solution (and preferably from 80° C. to 90° C.) for a period of about 10 to 15 minutes. Or, a solution of a titanium salt and a monobasic acid may be diluted with water, until on standing, the titanium values become colloidal, the resultant suspension being then subjected to dialysis and a moderate heat treatment. Again, I may coagulate and use in such coagulated state the seeding agent which results by mixing a solution of a titanium salt, preferably titanium chloride, and a monobasic acid with an alkaline reacting material, in amounts sufficient to provide a pH ranging from about 2 to about 4, the reactants being at such concentration that the mixture will contain titanium compounds in an amount equivalent to from about 10 to about 120 g. $TiO_2/l$. The resulting orthotitanic acid suspension is then heated to a temperature ranging from about 60 to about 95° C., and maintained at such temperatures for a period ranging from two minutes to about three hours. The metatitanic acid thus obtained is cooled to less than about 50° C., suitably dewatered, and then washed sufficiently to reduce its monovalent anion content to less than about 20 g./100 g. $TiO_2$. The washed precipitate is then slurried in water to provide a suspension containing from about 1 to 200 g. $TiO_2/l$, this suspension being then maintained at temperatures ranging from about 0 to 50° C., until substantially complete $TiO_2$ peptization is had. After peptization, the sol may be then coagulated with sodium hydroxide, following which it is washed free of chlorine or monovalent ions, prior to use in the hydrolysis. I also contemplate coagulating, and then using in coagulated condition in accordance with this invention the seeding agents disclosed in the aforesaid Keats, et al. applications, Ser. Nos. 283,052 and 283,051, and in the co-pending application of James E. Booge and myself, Serial No. 426,248, filed January 9, 1942, now abandoned.

The concentration of the coagulated seed suspension to be mixed with the titanium sulfate solution to be hydrolyzed is also variable over wide limits. Generally, I contemplate using in the titanium sulfate solution to be hydrolyzed an amount of coagulated seed ranging from about 1% to about 20%, on the basis of the $TiO_2$ to be hydrolzed. Hence, concentrations ranging from about 1 to about 100 g. per liter, calculated as $TiO_2$, or higher, may be used. Excessive dilutions should be avoided, however, because an undesired lowering of the $TiO_2$ concentration will otherwise occur during hydrolysis, requiring equipment of excessive size. At substantially 100 g. Ti₂O the seed suspension is relatively thick and viscous and, though employable, lesser concentrations, ranging from 20-80 g. per liter, induce optimum results under the invention and hence are preferred.

Employment of my novel type of nucleating agent in titanium sulfate hydrolysis not only results in increased yields of an improved form of titanium dioxide precipitate, but such hydrolysate possesses the desired characteristic of converting to rutile of exceptionally high pigment quality, especially tinting strength and color, on calcination at temperatures of a relatively low order, usually well below substantially 1000° C. Hence, higher temperatures, say, 1050° C. or above, though employable, may be dispensed with. In addition, said precipitate is more readily filterable and easier to purify, and the final pigment is relatively uniform and small in particle size. As a result, it will inherently exhibit the highest possible hiding power and thereby become adapted for all manners of pigment use.

Furthermore, my coagulated type of seed from whence chloride, nitrate or other corrosive ions have been effectively removed, reduces to a minimum or avoids completely the deleterious corrosive action of monovalent anion-containing solutions towards plant equipment, which is normally lead or bronze. Hydrochloric or nitric acids, when present in sulfuric acid, are exceedingly corrosive towards materials used in the hydrolysis tank, the heating coils, etc. They cause very rapid disintegration of the cloths used for the filtration of the pigment and finally seriously shorten the useful life of evaporators used in the reconcentration of the sulfuric acid. In a hydrolysis in which about 5% of seed nucleating agent is employed without my cogulation and filtration steps, the hydrolyzing liquor would contain greater than 1% of hydrochloric acid, which concentration would immediately attack plant equipment at a serious rate. By coagulating and washing the seed prior to its use, the chloride content may readily be reduced 50-fold or more and thus eliminate this serious corrosion problem. The hydrochloric acid content of the liquor under hydrolysis is thus reduced to a value of .05% and preferably to .02% or below.

Since my coagulated seeding agent may be employed at a concentration as high as about 100 g. TiO₂ per liter or in the form of press cake, whereas concentrations not in excess of about 20 g. TiO₂ per liter must be resorted to when titanium oxide sols are employed, my process permits one to hydrolyze titanium sulfate liquors at higher concentrations. This is a distinct and very considerable advantage as will be appreciated by those versed in the art, since under these conditions it is possible to produce pigments of a high degree of purity from ilmenite solutions containing substantial amounts of soluble color-imparting impurities. Thus, my process is not limited to any particular source of raw materials. I have found it to be particularly advantageous to operate the hydrolysis step at concentrations in excess of 120 g. TiO₂ per liter, and preferably in excess of 140-150 g. TiO₂ per liter. Pigments obtained by the calcination of such hydrolysates exhibit not only improved color, but more uniform particle size as well. It will be understood that these concentrations will not be achieved by the simple admixture of the titanium liquors obtained by sulfuric acid attack of ilmenite ores and an uncoagulated seed sol. Only by dewatering the seed by coagulation, followed by separation, can one employ these titanium liquors whose concentrations range from 175-200 g./l. TiO₂. Again, and as stated, the settling and filtering characteristics of the recovered hydrolysis precipitate are distinctly superior to other types of precipitates formed as a result of normal seeding in normal titanium sulfate hydrolysis or when the nucleating agents used comprise peptized TiO₂ sols. Additionally, my coagulated seed, being relatively insoluble as regards formation of a true colloidal solution (although subject to peptization to form a colloidal solution) can be more easily incorporated into titanium sulfate solutions which advantageously speeds up the titanium producing operations with substantial, accompanying monetary savings. This is especially true when it is considered that the improved nature of my hydrolysate permits more ready separation from its mother or residual liquor by decanting and subsequent dewatering of the thickened precipitate suspension by filtration. Also, my coagulated seeding agent may be employed at a concentration as high as about 100 g. TiO₂ per liter, whereas concentrations not in excess of about 20 g. TiO₂ per liter must be resorted to when said titanium oxide sols are employed. Therefore, my process permits one to hydrolyze more concentrated titanium sulfate liquors with resulting formation of more concentrated residual liquors adapted for ready use in the titaniferous material solubilizing or other stages of the titanium pigment producing operation. When employing prior sols, the residual liquors therefrom have been in such relatively dilute state that expensive evaporation operations have been first necessary before rendered useful in such solubilizing operations.

The herein-used term "titanic acid" includes hydrous or hydrated TiO₂, ortho or meta-titanic acid, or a TiO₂ precipitate or sol which results from the hydrolysis or dilution of a titanium salt solution, or is obtained from the neutralization of such a solution with a basic or alkaline material.

The term "calcining to develop pigment properties" includes that degree and time of elevated temperature treatment to which a raw pigment hydrolysate or precipitate is subjected in order to impart thereto or develop therein such essential or desired pigment properties as requisite tinting strength, hiding power, color, oil absorption, crystallinity, etc. It includes particularly those calcination temperatures which are normally used in anatase pigment manufacture, e. g., from about 750° C.–1000° C., and preferably from about 850° C.–975° C., as well as higher temperatures, e. g., about 1000° C. and up to 1050° C. or higher, which, because of the inherent nature or particular composition of the raw pigment being treated, are necessary to promote or effect the pigment development or rutile conversion desired.

The term "coagulated TiO₂ nucleating agent," used herein, includes a seeding material which, prior to coagulation, exists at some stage of its preparation in sol form and has been cured in an acidic peptizing medium. After coagulation, and prior to use, the seeding material is preferably purified or washed to remove soluble monovalent anions.

The term "rutile titanium oxide pigment" includes one exhibiting on X-ray analysis substantially the diffraction pattern of rutile, or both rutile and anatase, as well as a product the rutile component of the TiO2 of which is present in major proportion.

I claim as my invention:

1. A process for obtaining an improved rutile titanium oxide pigment exhibiting commercially satisfactory color, tinting strength and hiding power, comprising coagulating a previously peptized and monobasic acid-aged titanic acid sol obtained by peptizing and aging titanic acid at an elevated temperature in a monobasic acid, by incorporating in said sol a sufficient amount of a sulfate ion-containing compound to effect coagulation thereof, purifying and washing the resulting coagulated product, incorporating a small amount of said product as a seeding material into a hydrolyzable titanium sulfate solution, hydrolyzing the resulting mixture, and then calcining at a temperature ranging from 750–1000° C., the recovered, purified hydrolysate to develop its pigment properties.

2. A process for producing an improved rutile TiO2 pigment from titanium salt solutions comprising preparing a colloidally-dispersed titanic acid suspension by mixing a purified TiO2 precipitate with a monobasic acid, aging the dispersed TiO2 in the presence of the acidic peptizing agent until peptization is effected, flocculating the resulting peptized material by incorporating a coagulant therein, washing the coagulated seeding agent, incorporating a small amount of the purified product in a titanium salt solution, hydrolyzing the resulting mixture, and then calcining the recovered hydrolysate at a temperature ranging from 750–1000° C. to develop its pigment properties.

3. A process for producing an improved rutile titanium oxide pigment from a titanium sulfate solution comprising preparing a titanic acid dispersion by mixing a purified TiO2 precipitate with a monobasic acid, by mixing the purified TiO2 precipitate with a peptizing concentration of a monobasic acid, aging the resulting dispersion at an elevated temperature to develop the nucleating characteristics of said titanic acid, coagulating the peptized and aged TiO2 sol by incorporating an alkaline agent therein, washing the coagulated seeding agent to remove monovalent ions present therein, incorporating a small amount of the recovered seeding agent in a hydrolyzable titanium sulfate solution, hydrolyzing the resulting mixture and then calcining the recovered hydrolysate at a temperature ranging from 750–1000° C. from said hydrolysis to develop its pigment properties.

4. A process for producing an improved rutile TiO2 pigment from titanium salt solutions comprising preparing a colloidally-dispersed titanic acid suspension by mixing purified, precipitated TiO2 with a peptizing concentration of a monobasic acid, aging the dispersed TiO2 at an elevated temperature in the presence of the acidic peptizing agent, flocculating the resulting peptized material by incorporating a coagulant therein, washing the coagulated seeding agent, incorporating a small amount of the purified product in a concentrated titanium salt solution above 140 g. TiO2/l., hydrolyzing the resulting mixture, and then calcining the recovered hydrolysate at a temperature ranging from 750–1000° C. to develop its pigment properties.

5. A process for obtaining an improved rutile titanium oxide pigment from the hydrolytic decomposition of a titanium sulfate solution which comprises colloidally dispersing a purified titanic acid precipitate by peptizing the same at an elevated temperature in the presence of a sufficient concentration of a monobasic acid medium, aging the resulting dispersion at a temperature ranging from about 50–100° C. for a period of about 15–20 minutes to develop the nucleating characteristics of the titanic acid, coagulating the resulting peptized TiO2 sol by incorporating sufficient alkali hydroxide therein to induce coagulation thereof, washing the resulting coagulated seeding agent to remove monovalent ions therefrom, incorporating a small amount of the purified product in a hydrolyzable titanium sulfate solution, the TiO2 concentration of which ranges from about 100–225 g./l., hydrolyzing the resulting mixture at an elevated temperature, and then calcining the hydrolysate resulting from said hydrolysis at a temperature ranging from 750–1000° C. to develop its pigment properties.

6. A process for producing an improved rutile titanium oxide pigment by hydrolytic decomposition of a titanium sulfate solution which comprises colloidally dispersing titanic acid by mixing purified precipitated titanic acid with hydrochloric acid at a concentration ranging from about .2 to .8 N, subjecting the resulting mixture to heat treatment at a temperature ranging from about 80° C. to 100° C. for a period of about 15–20 minutes, whereby the nucleating characteristics of said titanic acid become activated, coagulating the resulting peptized TiO2 sol by incorporating a sufficient quantity of sodium hydroxide therein, washing the coagulated seeding agent to remove monovalent ions therefrom, mixing from about 1–5%, based on the TiO2 in the solution to be hydrolyzed, of the recovered seeding agent in a titanium sulfate solution, the TiO2 concentration of which ranges from 100–225 g./l., hydrolyzing the resulting mixture at an elevated temperature, and then calcining the recovered, purified hydrolysate from said hydrolysis at a temperature ranging from about 850–975° C. to develop its pigment properties.

CARL MARCUS OLSON.

REFERENCES CITED

The following references are of record in the file of this patent:

UNITED STATES PATENTS

| Number | Name | Date |
|---|---|---|
| 1,758,528 | Mecklenberg | May 13, 1930 |
| 1,766,592 | Blumenfeld | June 24, 1930 |
| 1,797,760 | De Rohden | Mar. 24, 1931 |
| 2,034,923 | Schmidt | Mar. 24, 1936 |
| 2,040,823 | Allan | May 19, 1936 |
| 2,062,134 | Kubelka | Nov. 24, 1936 |
| 2,091,799 | Weise | Aug. 31, 1937 |
| 2,143,850 | Allan | Jan. 17, 1939 |
| 2,285,485 | Barksdale et al. | June 9, 1942 |
| 2,303,306 | Tillmann et al. | Nov. 24, 1942 |

FOREIGN PATENTS

| Number | Country | Date |
|---|---|---|
| 405,669 | Great Britain | Feb. 12, 1934 |
| 533,227 | Great Britain | Feb. 10, 1941 |